(12) United States Patent
Diana et al.

(10) Patent No.: US 7,613,017 B1
(45) Date of Patent: Nov. 3, 2009

(54) GATED PULSE POWER CONVERTER SYSTEMS AND METHODS

(75) Inventors: Louis Robert Diana, Fountainville, PA (US); Dominick Frank Travaglini, Doylestown, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 340 days.

(21) Appl. No.: 11/243,093

(22) Filed: Oct. 4, 2005

Related U.S. Application Data

(60) Provisional application No. 60/615,858, filed on Oct. 4, 2004.

(51) Int. Cl.
*H02M 3/335* (2006.01)

(52) U.S. Cl. .................................. 363/20; 363/21.01

(58) Field of Classification Search .............. 363/20, 363/21.01, 21.02, 21.09, 21.11, 56.09
See application file for complete search history.

(56) References Cited

U.S. PATENT DOCUMENTS

| | | | | |
|---|---|---|---|---|
| 4,546,318 A | * | 10/1985 | Bowden | 324/376 |
| 5,170,333 A | * | 12/1992 | Niwayama | 363/21.11 |
| 5,621,630 A | * | 4/1997 | Suzuki et al. | 363/71 |
| 5,691,628 A | * | 11/1997 | Martin | 323/237 |
| 5,901,051 A | * | 5/1999 | Takahashi et al. | 363/21.18 |
| 5,943,227 A | * | 8/1999 | Bryson et al. | 363/95 |
| 6,275,018 B1 | | 8/2001 | Telefus et al. | 323/282 |
| 6,304,473 B1 | | 10/2001 | Telefus et al. | 363/97 |
| 7,027,313 B2 | * | 4/2006 | Amei | 363/21.12 |
| 2002/0008501 A1 | * | 1/2002 | Telefus et al. | 323/282 |
| 2002/0118552 A1 | * | 8/2002 | Nakagawa | 363/20 |

OTHER PUBLICATIONS

Sidney Soclof, "Design and Applications of Analog Integrated Circuits," California State University—Los Angeles, Prentice Hall Series in Solid State Physical Electronics (ISBN 0-13-026030-4).

* cited by examiner

*Primary Examiner*—Matthew V Nguyen
*Assistant Examiner*—Nguyen Tran
(74) *Attorney, Agent, or Firm*—McDermott Will & Emery LLP

(57) ABSTRACT

The present invention is generally directed to power converter systems and methods that regulate an output voltage by gating a fixed energy pulse. For example, a comparator may be used to gate a programmable timer that is optimized to provide a fixed "on-time" and "off-time" for a given load. For line variations, the on-time is adjusted via a control loop. That is, the on-time is compensated via the control loop to provide a fixed amount of energy at the output of the power converter. The off-time is configured to deliver the fixed duration of energy to the output storage capacitor. The comparator monitors the output voltage to allow a single fixed energy pulse to pass to the output storage capacitor when the output voltage is below a desired level. When the output voltage is above the desired level, energy transfer is temporarily ceased (i.e., energy pulses temporarily stop).

26 Claims, 8 Drawing Sheets

GATED PULSE POWER CONVERTER SYSTEMS AND METHODS

CROSS-REFERENCE TO RELATED APPLICATIONS

This application claims priority to and thus the benefit of an earlier filing date from U.S. Provisional Patent Application No. 60/615,858 (filed Oct. 4, 2004) and entitled "Gated Fixed Energy Control of Switched Mode Power Converters"; the entire contents of which are hereby incorporated by reference.

BACKGROUND

1. Technical Field

Systems and methods presented herein generally relate to power converters and more specifically to gated energy power converters.

2. Discussion of the Related Art

Compact and efficient power supplies are often desired by electronics manufacturers for a variety of reasons (e.g., to decrease device size and to improve power consumption). Pulse-width-modulated switching power supplies offer such compactness and efficiency in a number of different topologies, such as transformer-coupled switching power supplies (e.g., a flyback converter) and direct-coupled switching power supplies (e.g., buck or boost switching power converters). In a transformer-coupled power supply, the power output is isolated from the power input through a transformer, whereas the power output is not isolated from the power input in a direct-coupled switching power supply.

Pulse-width-modulated switching power supplies generally often employ a pulse width modulator ("PWM") that controls a duty cycle of power pulses. For example, a boost switching power supply may include a switch coupled to an inductor that provides electrical energy to the inductor and a capacitor that outputs electrical energy from the inductor. A pulse-width modulator adjusts the duty cycle of the switch in response to sensing an output voltage at the capacitor. The inductor receives energy when the switch is closed and transfers it to the capacitor when the switch is open. A relatively large capacitor maintains a substantially constant output during the second half of the duty cycle (e.g., when the switch is open). The "on-time" of the switch thus defines a power cycle (e.g., when the switch is closed and electrical energy is transferred to the capacitor). In a flyback converter, the pulse-width modulator again adjusts the duty cycle of the switch in response to sensing an output voltage at the capacitor. However, energy is stored in a transformer primary winding of the flyback converter during the first half of the duty cycle and transferred to the transformer secondary winder, and thus the load, during the second half of the duty cycle. In both cases, the output voltage is regulated because the PWM determines the rate at which electrical energy is delivered at the output of the converter.

SUMMARY

The present invention is generally directed to power converter systems and methods that regulate an output voltage by gating a fixed energy pulse. For example, a comparator may be used to gate a programmable timer that is optimized to provide a fixed "on-time" and "off-time" for a given load. For line variations, the on-time is adjusted via a control loop. That is, the on-time is compensated via the control loop to provide a fixed amount of energy at the output of the power converter. The off-time is configured to deliver the fixed duration of energy to the output storage capacitor. The comparator monitors the output voltage to allow a single fixed energy pulse to pass to the output storage capacitor when the output voltage is below a desired level. When the output voltage is above the desired level, energy transfer is temporarily ceased (i.e., energy pulses temporarily stop).

In performing these functions, the power converter does not require a repetition rate of energy transfer (i.e., pulse repetition frequency or "PRF"). That is, a fixed amount of energy is applied to the output storage capacitor when needed (i.e., when the output voltage is below a desired voltage level). The comparator modulates the off-time between pulses as required. Such a power converter leads to certain advantages, such as improved loop control and therefore a relative ease of paralleling the power converter with other devices. For example, the loop control makes the power converter stable with respect to a load because, among other reasons, the converter has a relatively flat efficiency with respect to the load and a repetition rate that responds to the load. Other advantages of the power converter include the ability of the power converter to respond to load transients with little change in the output voltage. Also, because the system does not require a fixed PRF, electromagnetic interference is reduced. Moreover, output voltage ripple decreases as a load increases because capacitor discharge time is faster than capacitor charge time. These and other advantages are achieved in accordance with a number of aspects of the present invention, examples of which are listed hereinbelow.

A first aspect of the invention is generally directed to a power converter that provides pulse power to a load coupled to an output of the power converter. The power converter may be configured to operate with one or more similarly configured power converters, or other devices, in parallel. Alternatively, or in addition to, the power converter may be configured to operate with one or more similarly configured power converters, or other devices, in series.

The power converter includes a magnetic storage device (e.g., a transformer or an inductor) coupled to a power supply and an output capacitor coupled to the magnetic storage device. For example, when the magnetic storage device is a transformer, the output capacitor may be coupled to a first winding of the transformer. In one embodiment, a diode is coupled between the magnetic storage device and the output capacitor. The power converter also includes a voltage regulator having an input coupled to the capacitor and an output coupled to the magnetic storage device (e.g., a second winding of the transformer). The voltage regulator includes a voltage detector having an output, an oscillator (e.g., a square wave oscillator) having an output and a drive circuit having an input. The output of the oscillator and the output of the voltage detector are coupled to an input of the drive circuit.

The voltage detector may include a voltage divider coupled to the output capacitor and a comparator (e.g., an inverting operational amplifier) having an input coupled to the voltage divider. The oscillator may include an operational amplifier (e.g., an inverting operational amplifier) having first and second inputs. The first input is coupled to a first feedback loop and to a capacitor. The second input is coupled to a second feedback loop. An output of the operational amplifier is configured for providing the oscillating signal.

The drive circuit may include a comparator having first and second inputs. The first input is coupled to a voltage reference. The input of the drive circuit includes a second input of the comparator. The drive circuit also includes a switch (e.g., a transistor) having a control terminal coupled to an output of the comparator and a conduction terminal coupled to the magnetic storage device (e.g., a second winding of the transformer).

A second aspect of the invention is generally directed to a method of supplying power to a load. The method includes the steps of discharging electric current from a charge storage device to the load, monitoring an output of the charge storage device, and charging the charge storage device when the monitored output at the charge storage device is less than a predetermined value. The step of charging includes steps of generating the control signal when the monitored output of the charge storage device is less than a reference voltage, summing a control signal and an oscillating signal (e.g., a square wave oscillating signal) to generate a summed signal, and controlling transfer of electric current to the charge storage device based on the summed signal. The step of charging may also include stepping a voltage from a first level to a second level using a transformer.

The step of generating may include a step of comparing the output of the charge storage device to the reference voltage. The step of controlling transfer of electric current to the charge storage device may include a step of comparing the summed signal to a reference voltage to generate a drive signal. The step of controlling transfer of electric current to the charge storage device may further include a step of using the drive signal to transfer electric current to the charge storage device. For example, the drive signal may be used to operate a switch to enable the step of controlling.

In one embodiment, the method may also include a step of inhibiting the charge storage device from discharging electric current in an undesired direction. For example, a diode may be used to prevent reverse discharge of electric current from the charge storage device. These and other aspects and advantages of the present invention will be apparent upon review of the following detailed description when taken in conjunction with the accompanying figures.

DETAILED DESCRIPTION OF THE DRAWINGS

Figure 1:
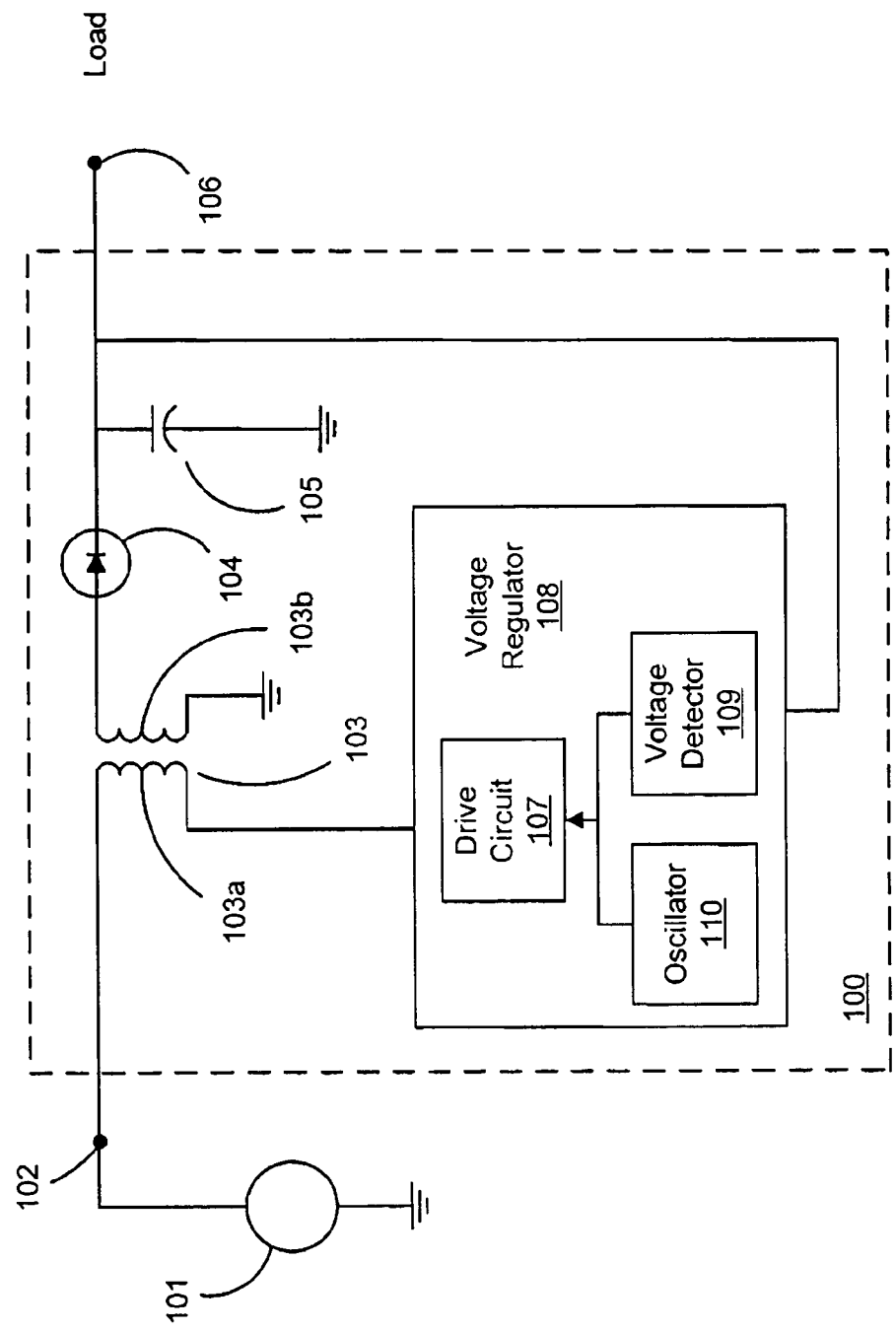
FIG. 1 is a diagram of a power converter, in one exemplary embodiment of the invention.

FIG. 1 is a diagram of a power converter 100, in one exemplary embodiment of the invention. In this embodiment, power converter 100 receives power from a power supply 101 and converts the received power for subsequent delivery to a load coupled at node 106. For example, power converter 100 may be coupled at node 102 to receive power from a power supply 101 or to a similarly configured power converter 100. Power converter may "step up" the voltage of the received power via transformer 103 for transfer to a load coupled at node 106. However, those skilled in the art should readily recognize that the transformer 103 may be configured in other ways that do not necessarily step up the voltage. For example, transformer 103 may be configured to transfer voltage from a primary winding 103a to a secondary winding 103b by either stepping down the voltage or transferring the same voltage. In any case, transformer 103 isolates power supply 101 from a load connected to node 106 because of the intrinsic safety of magnetically transferring power between windings 103a and 103b (e.g., no electrical connections).

To supply power to the load, power converter 100 is configured with an output capacitor 105 coupled to the secondary winding 103b of the transformer 103. Capacitor 105 is charged by transformer 103 and discharges to a load coupled at node 106. The power supplied to the load is controlled with a voltage regulator 108, which regulates voltage supplied to capacitor 105. For example, voltage regulator 108 may detect a voltage drop at capacitor 105 and, in response, control power delivery to capacitor 105. Also illustrated with power converter 100 is a diode 104, which may be configured between secondary winding 103b and capacitor 105 to prevent capacitor 105 from discharging electric current in an undesired manner, namely towards secondary winding 103b.

In this embodiment, voltage regulator 108 has an input coupled to capacitor 105 and an output coupled to primary winding 103a of the transformer 103. Voltage regulator 108 includes a voltage detector 109, an oscillator 110 and a drive circuit 107. Voltage detector 109 has an input coupled to monitor the output voltage at capacitor 105. Voltage detector 109 also has an output coupled to an input of drive circuit 107. Oscillator 110 also has an output coupled to the input of drive circuit 107. Accordingly, the outputs of oscillator 110 and voltage detector 109 are summed at the input of drive circuit 107.

Voltage detector 109 detects when a voltage supplied at node 106 has dropped below a predetermined level. For example, as capacitor 105 discharges and supplies electric current to the load at node 106, the voltage at node 106 may drop. Voltage detector 109 detects this voltage drop and generates a control signal to drive circuit 107. Drive circuit 107 may use this control signal to control electric current through primary winding 103a. For example, capacitor 105 may only be charged when electric current flows through primary winding 103a and induces current to flow in secondary winding 103b. Accordingly, drive circuit 107 controls electric current through primary winding 103a and, therefore, controls the charging of capacitor 105.

Oscillator 110 is configured for generating an oscillating signal, which is summed with the control signal of voltage detector 109. The oscillating signal adds a timing element to the control signal such that drive circuit 107 controls electric current through primary winding 103a on a timely basis. For example, oscillator 110 may generate a square wave, which is summed with the control signal from voltage detector 109. If the control signal indicates that the voltage at node 106 has dropped below a predetermined level, drive circuit 107 provides timely control over charging capacitor 105 based on the control signal and the oscillating signal.

The timing of this oscillating signal may be optimized to provide power for a given load. For example, the on-time or peak high voltage of the oscillating signal may be configured such that power is supplied to the load based on the type of load connected. The off-time or peak low voltage of the oscillating signal may be configured to allow for capacitor 105 to completely charge, as explained in greater detail below. Advantages of the power converter 100 include the ability to self-control power delivery to a load. For example, since power converter 100 requires no external control (e.g., from a microcontroller), power converter 100 simply responds to the power needs of the load based on a particular timing and power consumption of the load. This provides loop stability because, among other reasons, no controller is "fighting" for control of power delivery. In this regard, power converter 100 may more easily operate with other devices (e.g., similarly configured power converters, power supplies and/or microcontroller devices).

Figure 2:
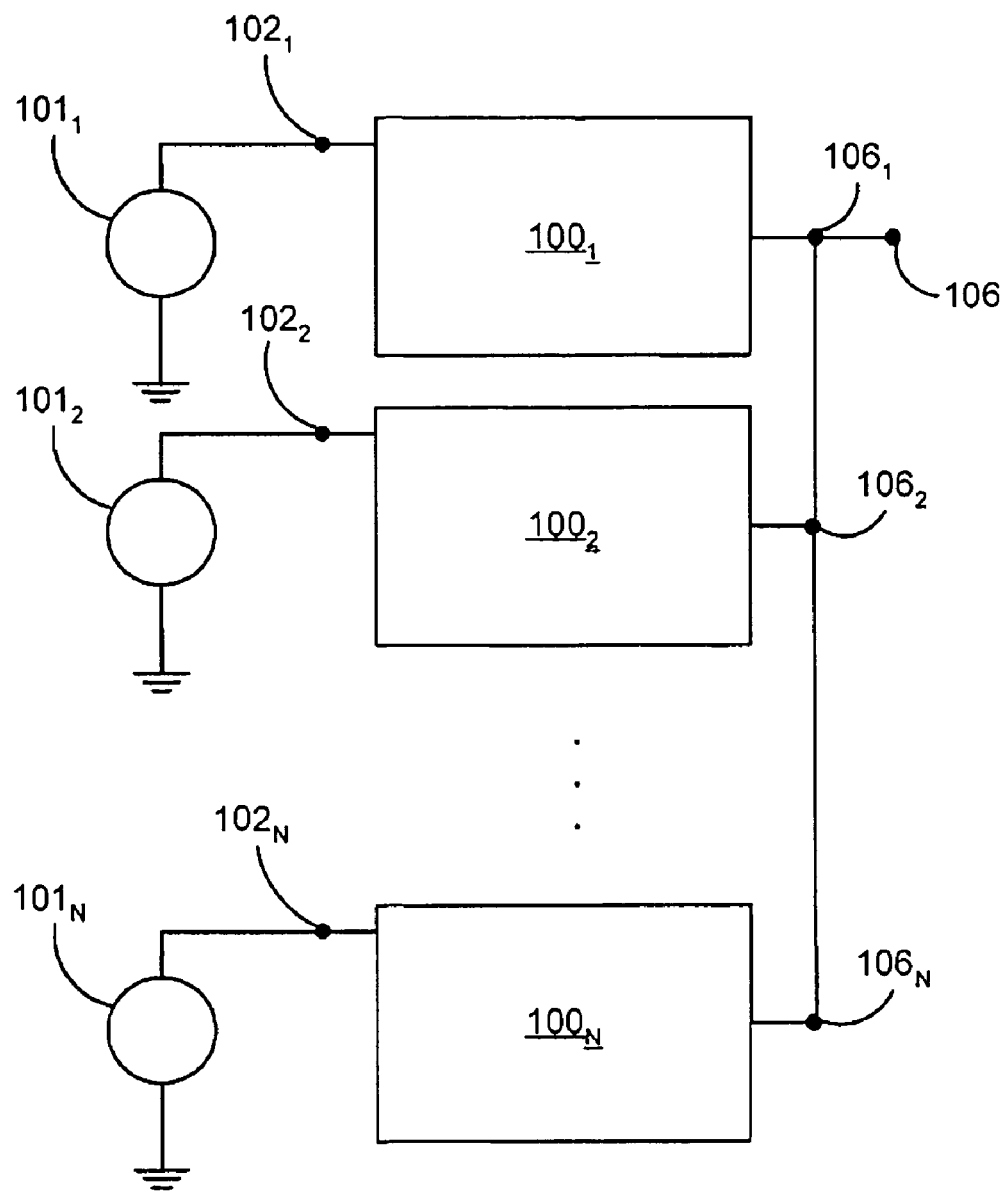
FIG. 2 is a block diagram of a parallel arrangement of power converters, in one exemplary embodiment of the invention.

FIG. 2 is a block diagram of a parallel arrangement of power converters 100, in one exemplary embodiment of the invention. As described in FIG. 1, power converter 100 includes certain features which allow it to cooperate with other devices, such as similarly configured power converters 100. In this embodiment, each power converter $100_1$, $100_2$ ... $100_N$ is configured with a corresponding power supply $101_1$, $101_2$ ... $101_N$ that couples to a node $102_1$, $102_2$ ... $102_N$. Each power converter $100_1$, $100_2$ ... $100_N$ is configured for converting power supplied by its associated power supply $101_1$, $101_2$ ... $101_N$ and delivering that converted power to a common node 106. The parallel configuration may allow for smaller and, thus, less expensive power converters $100_1$, $100_2$ ... $100_N$ to combine and deliver power in parallel with the need for centralized control.

Figure 3:
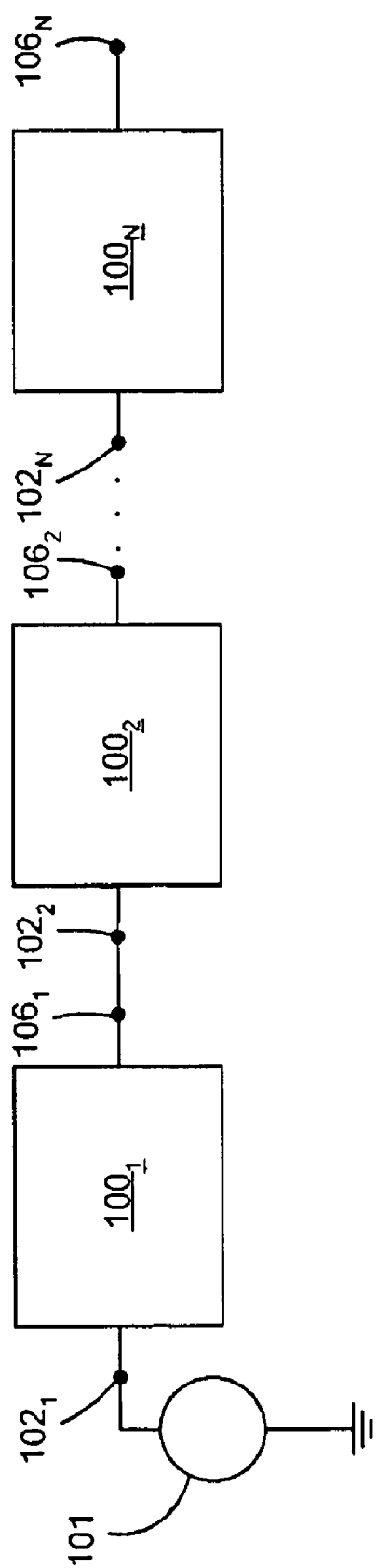
FIG. 3 is a block diagram of a serial arrangement of power converters, in one exemplary embodiment of the invention.

FIG. 3 is a block diagram of a serial arrangement of power converters $100_1$, $100_2$ ... $100_N$, in one exemplary embodiment of the invention. For example, power converters $100_1$, $100_2$ ... $100_N$ are connected to one another in series (e.g. node $106_N$ is connected to node $102_N$) to illustrate the compatibility of one of power converters $100_1$, $100_2$ ... $100_N$ with another of power converter $100_1$, $100_2$ ... $100_N$. This serial configuration illustrates how power converters $100_1$, $100_2$ ... $100_N$ may cooperatively amplify power supplied from a power supply 101. As such, those skilled in the art should readily recognize that the serial configuration described herein may be used in other ways to amplify power delivered to a load.

Figure 4:
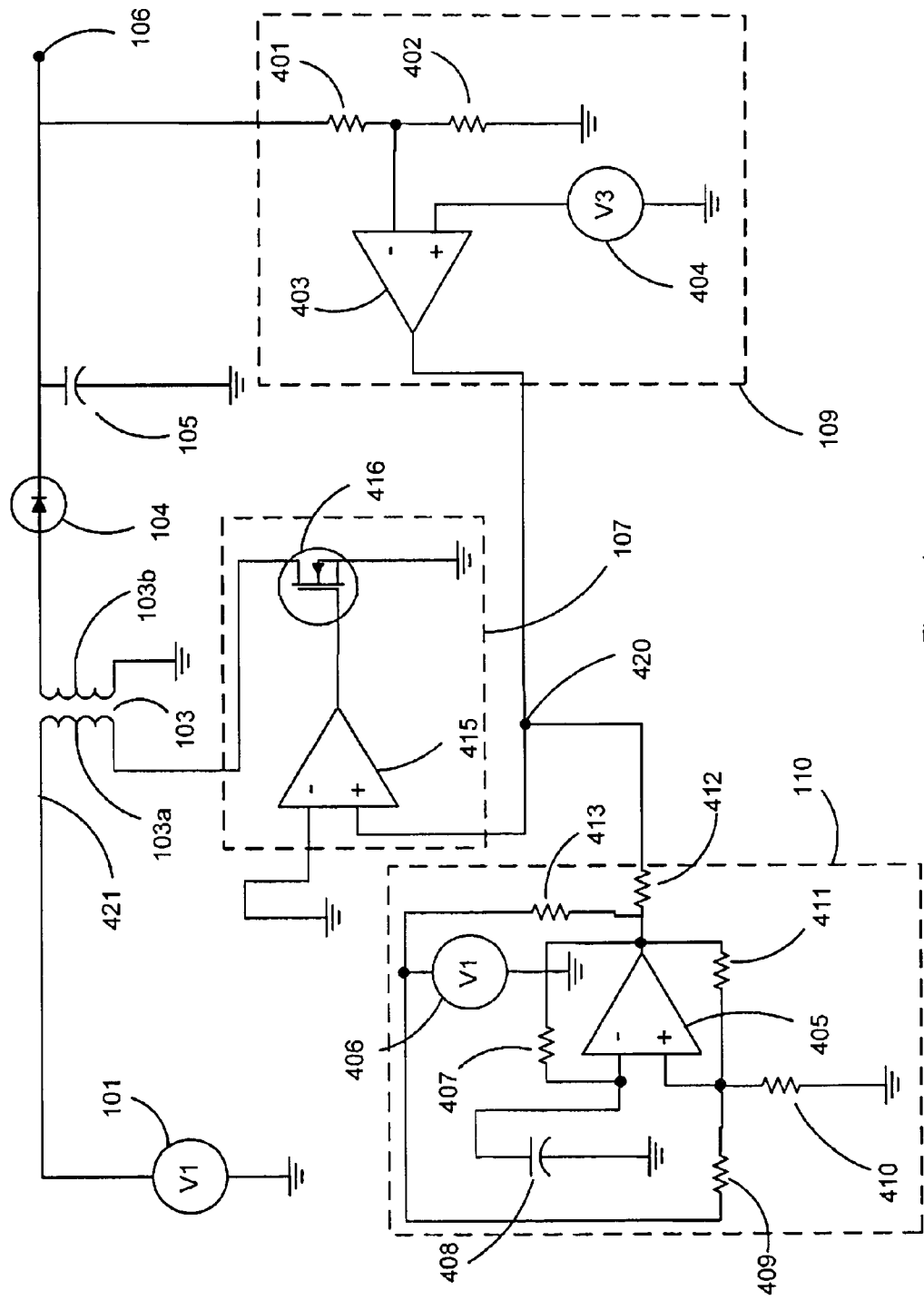
FIG. 4 is a schematic diagram of a power converter, in one exemplary embodiment of the invention.

FIG. 4 is a schematic diagram of a power converter 100, in one exemplary embodiment of the invention. In this embodiment, power converter 100 is configured in the manner illustrated and described in FIG. 1 with certain components being illustrated and described in greater detail. For example, components of the voltage regulator 108 are exemplarily illustrated in a preferred embodiment wherein individual components of voltage detector 109, oscillator 110 and drive circuit 107 are described and illustrated in greater detail.

Voltage regulator 109 includes a voltage divider formed from resistors 401 and 402, which scales an output voltage of capacitor 105 before being input voltage to comparator 403. In this regard, the voltage divider is coupled to an output of capacitor 105 and to an inverting input of comparator 403. Comparator 403 compares the output voltage through the voltage divider (i.e., resistors 401 and 402) to a reference voltage 404 coupled to a noninverting input of comparator 403. Comparator 403 uses the reference voltage to determine when the output voltage at node 106 has dropped below a desired level. If the voltage at the voltage divider input of comparator 403 drops below reference voltage 404, comparator 403 outputs a control signal proportional to the drop in voltage.

Oscillator 110 includes an operational amplifier 405 for outputting an oscillating signal, preferably, a square wave signal. Operational amplifier 405 has an inverting input coupled to a capacitor 408. Also coupled to that inverting input is a feedback loop with resistor 407. Oscillator 110 also includes a noninverting input coupled to a supply 406 for receiving a current through resistor 409. The noninverting input is also coupled to a feedback loop through resistor 411 and to a ground reference voltage through resistor 410. Supply 406 is also coupled to the output of operational amplifier 405 through resistor 413 to bias the output of the oscillating signal. As used herein, a square wave signal is not intended to be limited to a particular duty cycle. For example, a square wave is not intended to be limited to a 50% duty cycle. Square waves and their associated duty cycles are well-known to those skilled in the art and their selections are often a matter of design choice.

The square wave generated by oscillator 110 may be adjusted based on the requirements of a particular load coupled at node 106. For example, certain loads may require more rapid switching and/or larger charge cycles to supply current thereto. Accordingly, the square wave generated by oscillator 110 may be generated to have higher frequency and/or longer "on-time" durations. Components of oscillator 110 (e.g., capacitor 408, resistor 407, resistor 413, resistor 412, resistor 411, resistor 410 and resistor 409) may have values that are selectable based on a particular load. For example, changing component values of the resistors and/or the capacitor may result in a change in duty cycle and/or frequency of the square wave. Alternatively, some components may be adjustable such that values are variable.

The square wave generated by oscillator 110 is summed with the control signal output from voltage regulator 109 at node 420 (e.g., the control signal gates the square wave generated by oscillator 110). The signal summation is provided to an input of drive circuit 107 to determine when electric current should flow through primary winding 103a of transformer 103 and thereby charge capacitor 105. For example, drive circuit 107 includes a comparator 415 having a noninverting input coupled to node 420 to receive the summed signal (i.e., the control signal of voltage regulator 109 and the oscillating signal of oscillator 110). The control signal includes an electric current that increases when the voltage at the voltage divider (i.e., resistor 401 and 402) of voltage regulator 109 drops below reference voltage 404. This increased current is supplied to the noninverting input of comparator 415 such that comparator 415 generates a drive signal to a gate of transistor 416. Transistor 416 may comprise an N-type Metal Oxide Semiconductor Field Effect Transistor ("MOSFET") 416. Other types of transistors may also be utilized. The drive signal "turns on" MOSFET 416 to conduct current through primary winding 103a of transformer 103 to induce current in secondary winding 103b and subsequently charge capacitor 105.

The oscillating signal from oscillator 110, in essence "gates" the generation of the drive signal by increasing the current at the noninverting input 415 to a level that triggers comparator 415 to generate the drive signal. For example, the load placed at node 106 may cause the charging/discharging of capacitor 105. The oscillating signal may allow for a single pulse of energy to be transferred to completely charge capacitor 105. A voltage "low" of the oscillating signal, in essence, "turns off" charging of capacitor 105 and allows capacitor 105 discharge to the load. Such operable characteristics of power converter 100 are illustrated and described in greater detail below in FIGS. 7 and 8.

Although one preferred embodiment of a square wave oscillator is illustrated and described herein with respect to oscillator 410, those skilled in the art should readily recognize that square wave oscillators may be configured in other ways that fall within the scope and spirit of the invention. Additionally, those skilled in the art should readily recognize that the invention is not intended to be limited to square wave generation; rather, other oscillating signals may be used that also fall within the scope and spirit of the invention. And, although one embodiment of power converter 100 has been shown and described herein, those skilled in the art should readily recognize that the invention is not intended to be limited to the illustrated embodiment. Components of power converter 100 may be configured in other ways that fall within the scope and spirit of the invention. For example, the signal summed at node 420 may be such that the generated drive signal is used to drive an P-type MOSFET. Accordingly, configurations of oscillator 110 and/or voltage regulator 109 may be changed to accommodate the differing functionality of driving a P-type MOSFET for controlling charge to the capacitor 105.

Figure 5:
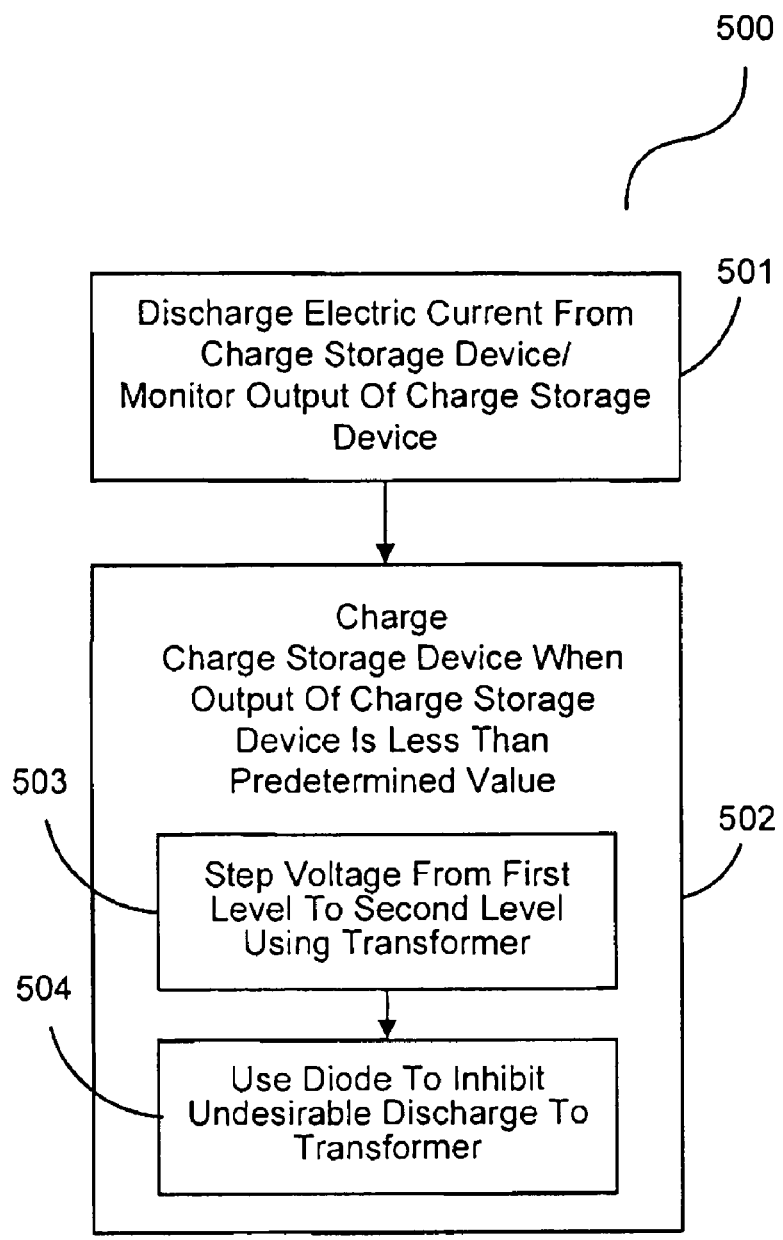
FIG. 5 is a flowchart illustrating a method in accordance with one exemplary embodiment of the invention.

FIG. 5 is a flowchart illustrating a method 500 in one exemplary embodiment of the invention. Electric current is discharged from a charge storage device (e.g., a capacitor such as capacitor 105 of FIG. 1), in element 501, while monitoring an output from the charge storage device. The charge storage device is recharged when the output voltage of the charge storage device falls below a predetermined value, in element 502. For example, when a voltage regulator detects a voltage drop at the output of power converter 100, the voltage regulator may generate a control signal that is used to initiate charging of the charge storage device.

Charging of the charge storage device may include stepping voltage from a first level to a second level using a transformer, in element 503. For example, when the voltage regulator initiates charging of the charge storage device, current may flow through a first winding of a transformer to induce current in a second winding of the transformer (e.g., primary winding 103a and secondary winding 103b of transformer 103). This induced current may be used to charge the charge storage device. Additionally, the method may include using a diode to inhibit an undesirable discharge to the transformer, in element 504. For example, a diode may be forward biased with respect to the transformer to prevent the charge storage device from discharging back to the transformer. Accordingly, the diode substantially ensures that electric current from the charge storage device will be delivered to the load. Alternatively, a synchronous rectifier may be used in place of a diode which may improve efficiency.

Figure 6:
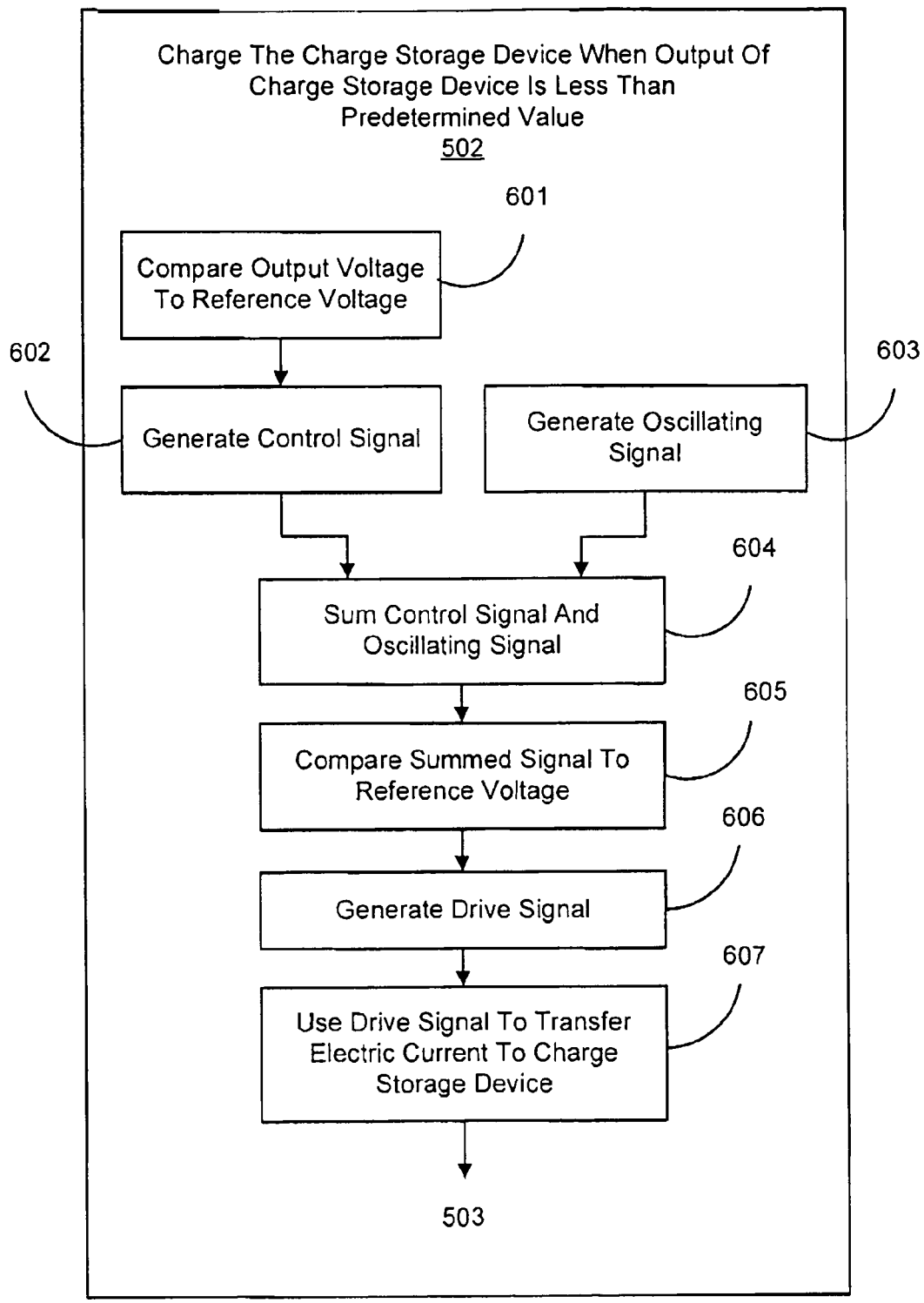
FIG. 6 is a flowchart illustrating a process of the method of FIG. 5, in one exemplary embodiment of the invention.

FIG. 6 is a flowchart illustrating a process of element 502 of the flowchart of FIG. 5, in one exemplary embodiment of the invention. For example, charging of the charge storage device when the output of the charge storage device is less than a predetermined value may include comparing an output voltage of the charge storage device to a reference voltage, in element 601. When the output voltage of the charge storage device is below the predetermined level, a control signal may be generated, in element 602, to initiate recharging of the charge storage device. The processes of elements 601 and 602 may be performed using a voltage regulator, such as voltage regulator 109 of FIG. 4. While the output voltage is being monitored, an oscillating signal may be generated, in element 603. For example, an oscillator, such as oscillator 110 of FIG. 4, may generate a square wave signal, as described hereinabove.

In element 604, in the oscillating signal generated by the process of element 603 may be summed with the control signal generated by the process of element 602. The summed signal generated by the process of element 604 may be compared to a reference voltage, in element 605. For example, a drive circuit, such as drive circuit 107 of FIG. 4, may compare the summed signal to a ground reference voltage to generate a drive signal, in element 606. The drive signal may be used to control a transistor, such as MOSFET 416 of FIG. 4, to conduct electric current through the first winding of the transformer as described in FIG. 5. This electric current as controlled by the drive signal may be used to charge the charge storage device, in element 607.

Figure 7:
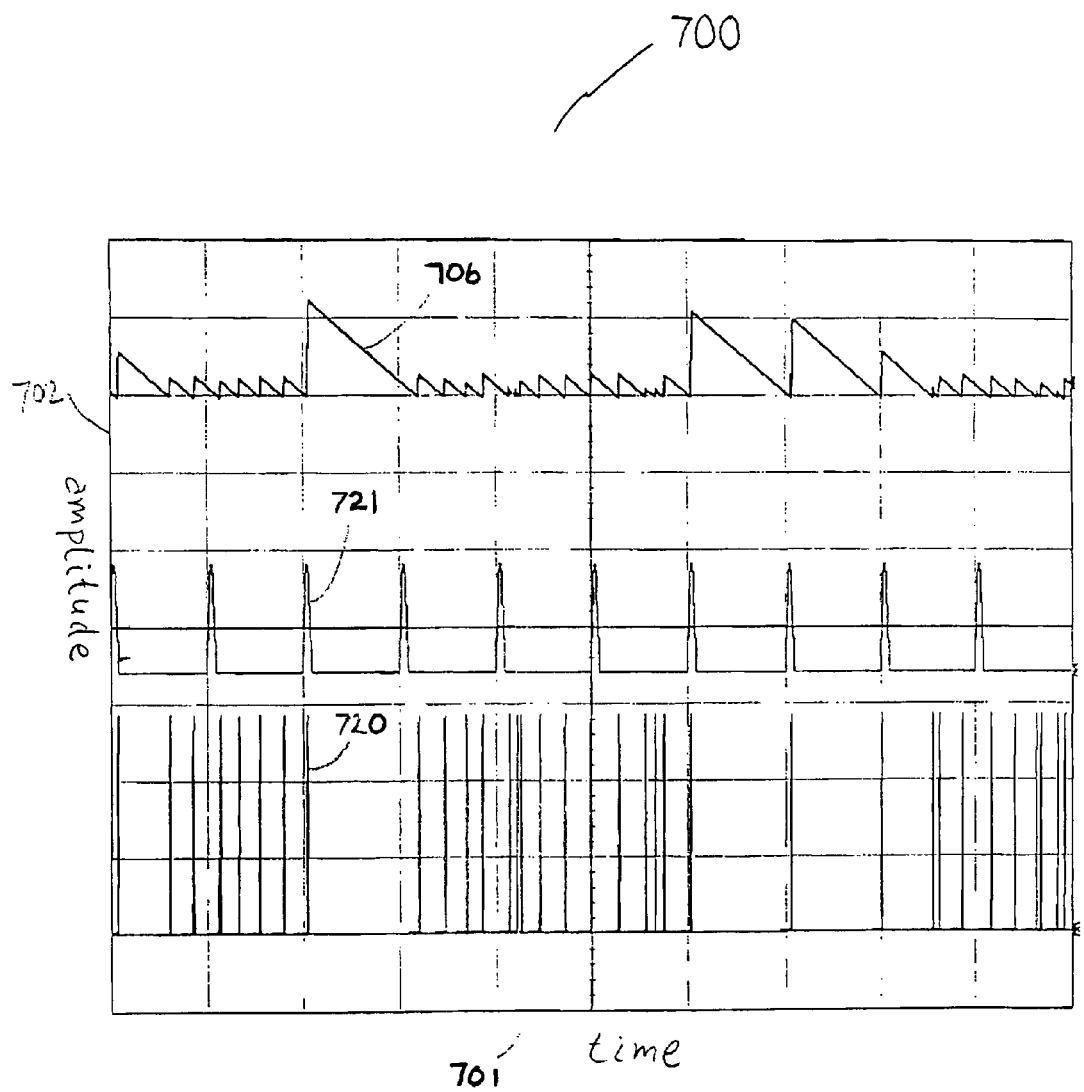
FIG. 7 is an amplitude versus time graph illustrating experimental results of signals generated by an exemplary power converter.

FIG. 7 is an amplitude (axis 702) versus time (axis 701) graph 700 illustrating experimental results of signals generated by an exemplary power converter, such as power converter 100 of FIG. 4. For example, graph 700 illustrates three signals obtained at various points from the power converter 100 described and illustrated in FIG. 4. A first signal 706 is obtained at output node 106 and represents charging of capacitor 105 and discharging electric current from capacitor 105 to a load coupled at node 106. This charging and discharging of capacitor 105 is visible in the larger sawtooth peaks of signal 706. Charging of the capacitor 105 occurs during the rise of a sawtooth whereas discharging of the capacitor 105 occurs during the fall of the sawtooth.

The signal 720 at node 420 illustrates the input signal to comparator 415 and represents the summation of the oscillating signal from oscillator 110 and the control signal from voltage regulator 109. The oscillating signal of oscillator 110 is a square wave signal that "gates" the control signal to comparator 415. For example, when the square wave signal is summed at node 420 with the control signal from comparator 403, the summed signal 720 (i.e., the square wave signal gated by the control signal at node 420) is compared to a ground reference voltage by the comparator to generate a drive signal. When the summed signal 720 drops below the ground reference voltage (e.g., and when the square wave pulse is a voltage "high"), comparator 415 generates a single drive signal pulse "high" to "turn on" N-type MOSFET 416. Accordingly, the voltage at the transformer increases to deliver a single fixed duration energy pulse (i.e., electric current) through the primary winding 103a of transformer 103 to charge capacitor 105. This voltage signal 721 is present at node 421 and represents a load current transient on the output (i.e., direct current; or "DC"). While the square wave is a voltage low, all drive signal pulses are essentially shut off and capacitor 105 discharges according to the load. When the square wave returns to voltage high, drive signals are enabled and voltage is "switched" to charge capacitor 105 as illustrated by the ripple signal at node 106. Summarizing, signals 720 and 721 represent load current transients on output node 106 with signal 721 being the load current at DC.

Figure 8:
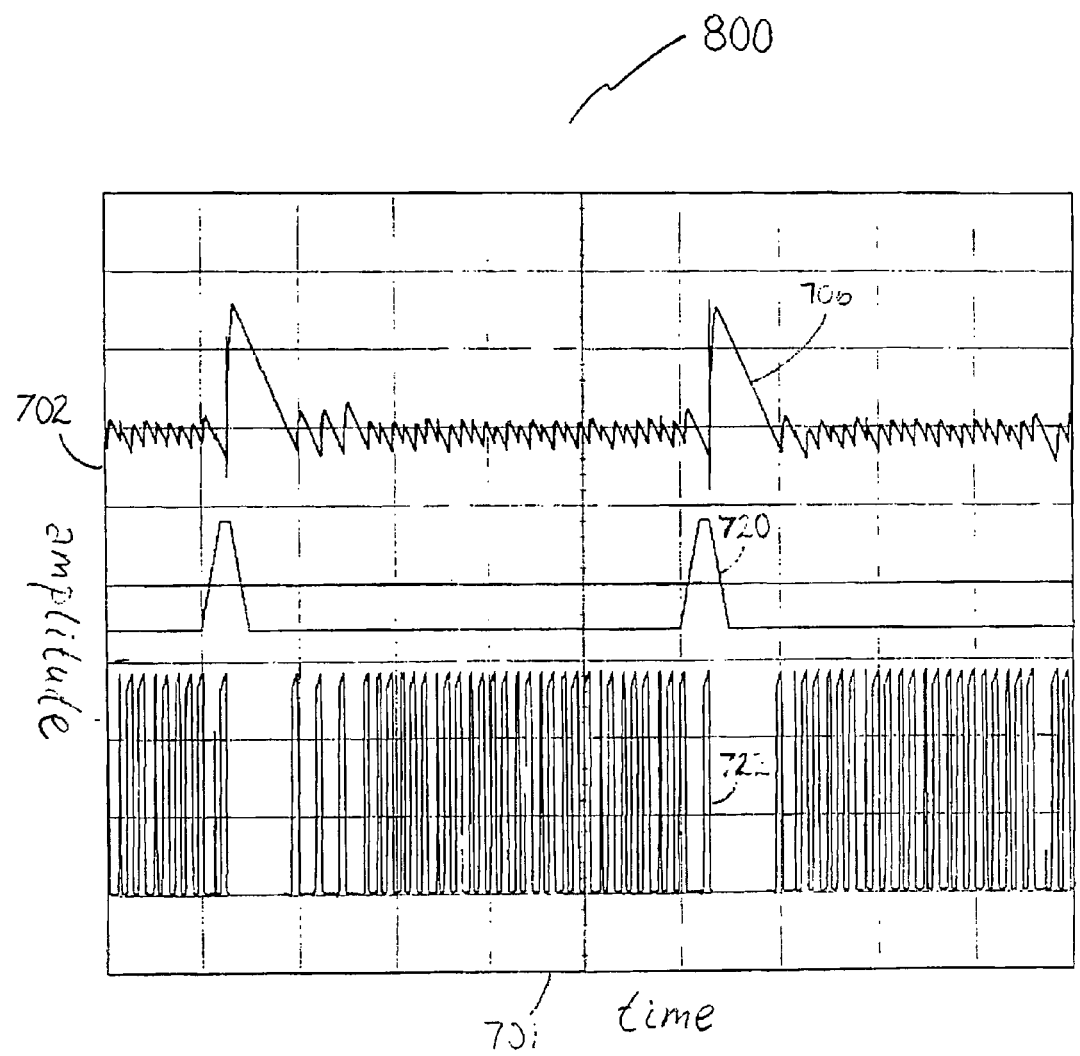
FIG. 8 is another amplitude versus time graph illustrating experimental results of signals generated by an exemplary power converter.

FIG. 8 is another amplitude (axis 702) versus time (axis 701) graph 800 illustrating experimental results of signals generated by an exemplary power converter, such as power converter 100 of FIG. 4. The signals (706, 720, 721) illustrated in FIG. 7 are illustrated here in FIG. 8 at the same nodes (106, 420, 421) of the power converter 100 of FIG. 4. The difference between FIG. 8 and FIG. 7 is that a load is applied to the power converter 100. For example, the load applied at node 106 is a larger load which causes drive circuit 107 to generate more drive signal pulses (e.g., illustrated in the increased frequency of pulse "highs" at node 420) and operate transformer 103 to charge capacitor 105. Just prior to the square wave dropping to a voltage low (i.e., at the predetermined interval), the power converter allows for a single fixed energy pulse to pass to capacitor 105 as illustrated by the large sawtooth at node 106. The fall of the sawtooth represents the discharging of the capacitor 105.

While the invention has been illustrated and described in detail in the drawings and foregoing description, such illustration and description is to be considered as exemplary and not restrictive in character. Accordingly, it should be understood that only the preferred embodiment and minor variants thereof have been shown and described and that all changes and modifications that come within the spirit of the invention are desired to be protected.

What is claimed is:

1. A power converter, comprising:
a magnetic storage device coupled to a power supply;
an output capacitor coupled to the magnetic storage device;
a voltage regulator having an input coupled to the capacitor and an output coupled to the magnetic storage device, wherein the voltage regulator comprises a voltage detector having an output, an oscillator having an output, and a drive circuit having an input, and wherein the output of the voltage detector, the output of the oscillator, and the input of the drive circuit are directly connected together to form a single node,
wherein the drive circuit comprises:
a comparator having a first input, a second input, and an output, wherein the first input is coupled to a reference voltage, and the second input is coupled to the single node; and
a switch having a control terminal coupled to the output of the comparator and a conduction terminal coupled to the magnetic storage device.

2. The power converter of claim 1, further comprising a diode coupled between the magnetic storage device and the output capacitor.

3. The power converter of claim 1, wherein the voltage detector comprises: a voltage divider coupled to the output capacitor; and
an comparator having an input coupled to the voltage divider.

4. The power converter of claim 3, wherein the comparator comprises an inverting operational amplifier.

5. The power converter of claim 1, wherein the oscillator comprises a square-wave oscillator.

6. The power converter of claim 1, wherein the oscillator comprises:
an operational amplifier having a first input and a second input, the first input being coupled to a first feedback loop and to a second capacitor, the second input being coupled to a second feedback loop.

7. The power converter of claim 6, wherein the operational amplifier comprises an inverting operational amplifier.

8. The power converter of claim 6, wherein the output of the oscillator comprises an output of the operational amplifier.

9. The power converter of claim 1, wherein the switch comprises a transistor.

10. The power converter of claim 1, configurable to operate with one or more similarly configured power converters in parallel.

11. The power converter of claim 1, configurable to operate with one or more similarly configured power converters in series.

12. A power supply, comprising:
means for providing electric current to a load;
means for detecting an output voltage at said load;
means for generating an oscillating signal; and
means for controlling said means for providing electric current in response to a detected said output voltage being less than a threshold voltage;
wherein said means for controlling said means for providing electric current comprises means for gating the oscillating signal with a control signal, and wherein the control signal is generated based on the detected said output voltage, and wherein an output of said means for generating the oscillating signal, an output of said means for detecting the output voltage, and an input of said means for controlling are directly connected to form a single node;
wherein said means for controlling said means for providing electric current further comprises:
a comparator having a first input coupled to a reference signal and a second input coupled to the single node; and
a switch having a control terminal coupled to an output of the comparator, wherein the switch is configured to provide control of said means for providing electric current.

13. The power supply of claim 12, wherein said means for detecting an output voltage comprises:
a voltage divider; and
a comparator having a first input coupled through said voltage divider to said means for providing electric current.

14. The power supply of claim 12, wherein said means for generating the oscillating signal comprises:
a capacitor; and
an operational amplifier having an input and an output, the input being coupled to the capacitor and to a feedback loop, the output being configured for providing the oscillating signal.

15. The power supply of claim 12, wherein the means for providing electric current comprises:
a capacitor; and
a source coupled to a conduction terminal of the capacitor and configured for charging the capacitor.

16. The power supply of claim 15, wherein the source comprises a transformer configured for charging the capacitor and having a first winding coupled to said means for controlling, wherein said means for controlling further comprises means for disengaging the transformer from charging the capacitor when the detected said output voltage is less than the threshold voltage.

17. The power supply of claim 15, further comprising a diode coupled between the capacitor and the source.

18. The power supply of claim 15, wherein said means for gating comprises a node coupled to an output of said means for detecting and to an output of an oscillator which provides the oscillating signal.

19. A method of supplying power to a load, comprising steps of:
discharging electric current from a charge storage device to the load;
monitoring an output of the charge storage device; and
charging the charge storage device when the monitored output at the charge storage device is less than a predetermined value, wherein said step of charging comprises steps of:
generating a control signal when the monitored output of the charge storage device is less than a reference voltage;
generating an oscillating signal;
gating the control signal and the oscillating signal to generate a gated signal; and
controlling transfer of electric current to the charge storage device based on the gated signal;
wherein said step of gating is performed at a single node comprising an output of circuitry used in said step of generating a control signal, an output of circuitry used in said step of generating the oscillating signal, and an input of circuitry used in said step of controlling,
wherein said step of controller comprises a step of comparing the gated signal at the single node to a reference voltage to generate a drive signal and controlling a switch based on the comparison, wherein the switch is configured to control the transfer of electrical current to the charge storage device.

20. The method of claim 19, wherein said step of generating comprises a step of comparing the output of the charge storage device to the reference voltage.

21. The method of claim 19, wherein said step of charging further comprises a step of generating the oscillating signal as a square wave oscillating signal.

22. The method of claim 19, wherein said step of controlling transfer of electric current to the charge storage device comprises a step of comparing the gated signal to a reference voltage to generate a drive signal.

23. The method of claim 22, wherein said step of controlling transfer of electric current to the charge storage device further comprises a step of using the drive signal to transfer electric current to the charge storage device.

24. The method of claim 23, wherein said step of using the drive signal comprises operating a switch with the drive signal to enable said step of controlling.

25. The method of claim 19, further comprising a step of inhibiting the charge storage device from discharging electric current in an undesired direction.

26. The method of claim 19, wherein said step of charging further comprises a step of stepping a voltage from a first level to a second level using a transformer.

* * * * *